United States Patent [19]

Kits van Heyningen

[11] 4,404,665
[45] Sep. 13, 1983

[54] SEA BOTTOM SLOPE COMPENSATION APPARATUS

[75] Inventor: Arent H. Kits van Heyningen, Newport, R.I.

[73] Assignee: Raytheon Company, Lexington, Mass.

[21] Appl. No.: 198,559

[22] Filed: Oct. 20, 1980

[51] Int. Cl.$^3$ .......................... G01S 7/52; G01S 15/02
[52] U.S. Cl. .................................... 367/100; 364/728; 364/862
[58] Field of Search .................................. 367/88, 100; 343/100 CL; 364/728, 862, 819, 824

[56] References Cited

U.S. PATENT DOCUMENTS

| | | | |
|---|---|---|---|
| 2,253,975 | 8/1941 | Guanella | 367/100 |
| 3,696,414 | 10/1972 | Allen et al. | 367/100 X |
| 3,798,590 | 3/1974 | Jacobson et al. | 367/100 X |
| 3,997,973 | 12/1976 | Buss | 364/862 |
| 4,019,038 | 4/1977 | Critten et al. | 364/728 |
| 4,207,620 | 6/1980 | Morgera | 367/100 X |
| 4,255,795 | 3/1981 | Hechtenberg | 364/728 |
| 4,287,578 | 9/1981 | Heyser | 367/100 X |

*Primary Examiner*—Richard A. Farley
*Attorney, Agent, or Firm*—Martin M. Santa; Richard M. Sharkansky; Joseph D. Pannone

[57] ABSTRACT

A sonar system for the detection of signals reflected from a sloping ocean bed in which a sample of the transmitted signal is modified to correspond to the received signal as modified by the sea bottom before both signals are applied to a correlation detector. Modification of the transmitted signal sample is provided by summing incrementally delayed portions of the transmitted signal sample.

16 Claims, 5 Drawing Figures

SEA BOTTOM SLOPE COMPENSATION APPARATUS

BACKGROUND OF THE INVENTION

This invention relates generally to signal processors and more particularly to ranging and depth finding (sonar) signal processors.

As is known in the art, ranging and depth finding systems generally rely upon detecting a received signal by using matched filter or correlation techniques to improve the signal to noise ratio of the received signal i.e. the signal power relative to the power in the received background noise produced by the medium through which the signal propagates. In the case of a sonar system, sea water in the propagation medium between a receiving transducer and the seabed reflecting the transmitted wave. The sea water may produce background noise comparable in power to the power of the signal. Coding of the transmitted signal and matched filter detection are often employed to improve the signal to noise ratio of the received signal. However, abnormalities in the propagation medium or of the reflecting seabed cause distortion of the received signal thereby reducing the effectiveness of the matched filter in providing optimum signal to noise ratio detection. The degree of the distortion is related to the slope of the portion of the seabed reflecting the transmitted wave relative to the wavefront of such transmitted wave. When a signal is reflected from such a sloping surface, the reduction in correlation reduces the signal to noise ratio. Further, at extreme conditions, detection of the reflected signal is not possible.

SUMMARY OF THE INVENTION

It is therefore an object of this invention to provide a system for receiving signals from a sloping ocean bed which after suitable processing provides a signal of substantially the same amplitude as that provided by the system from a flat ocean bed.

The aforementioned problem is overcome and the stated objective together with other objectives and advantages are provided by a ranging system which, in accordance with a preferred embodiment of the invention, includes a receiver of sonic echos of the type which provides detection of the received signal by correlation of the received signal with a modification of the transmitted signal. In a preferred embodiment, the transmitted signal is passed through a transversal filter having a transfer function corresponding to the transfer function of the reflecting target to provide a signal which corresponds to the received signal. The amplitude of the thus filtered signal is preferably caused to be substantially equal to the amplitude of the received signal for optimal detection by cross-correlation.

In a preferred embodiment of the invention, a sample of the transmitted signal is passed through a transversal filter in the receiver before being bandpass filtered and correlation detected with the received signal which has been similarly bandpass filtered. The transversal filter is preferably of the type wherein the incremental delays provided by the filter may be made a function of an easily controllable quantity such as a shift frequency so that the overall response of the transversal filter can be made to match the received signal whose characteristics will be affected by both the depth of the ocean bed and the angle of slope of the bed. Another preferred embodiment is described wherein the shift frequency is automatically controlled to provide the largest signal output and uses two parallel reference channels wherein the shift frequency in each channel differs from one another by a prescribed amount. The output of each channel is compared to determine the direction in which the shift frequency should be changed in order to cause the auto correlated outputs of each channel to be substantially equal. This circuitry permits the system to track variations in bottom slope automatically without operator intervention. Another embodiment of the invention introduces the sampled transmitted signal into a different portion of the delay line of the transversal filter to reduce the shift frequency change required to compensate for the rangebottom slope distortion of the received signal.

BRIEF DESCRIPTION OF THE DRAWINGS

The aforementioned aspects and other features of this invention are explained in the following description taken in conjunction with the accompanying drawings wherein.

DESCRIPTION OF THE PREFERRED EMBODIMENT

Figure 1:
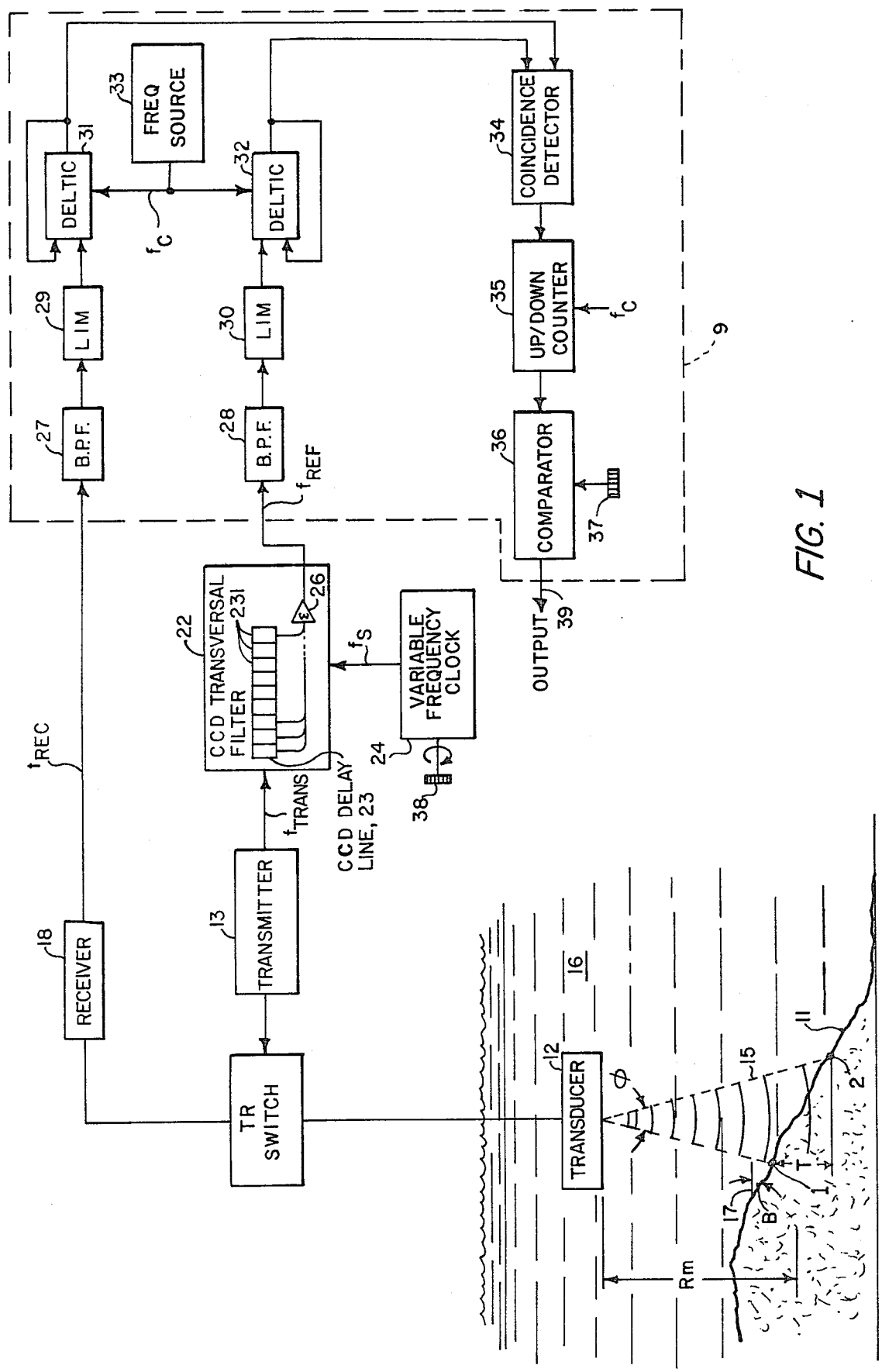
FIG. 1 is a schematic drawing of a single channel embodiment of the invention.

FIG. 1 shows a block diagram of a ranging system 10 of a type used in a downward-looking sonar for measuring the distance of the reflecting surface of the ocean bottom 11 to the transducer 12 which is mounted in a surface ship or a submarine for the purpose of determining the clearance between the vessel and the sea bottom. The invention may be utilized in a forward-looking ranging sonar such as that described in the U.S. Pat. No. 3,886,487 which issued in the name of George H. Walsh et al on May 27, 1975 for measuring the distances of reflecting surfaces ahead of the ship. The forward-looking sonar described in the aforementioned Walsh patent utilizes a one bit correlator as does the present invention. Another sonar ranging system is also described in U.S. Pat. No. 3,786,405 which issued to M. A. Chramiec and W. L. Conrad on Jan. 15, 1974. The one bit correlator system of Chramiec et al provides a clear output signal in response to echoes received from flat bottoms in the ocean. This invention is particularly useful for a system such as that of Chramiec et al because that system, relying upon the nonlinearity of the water to produce a third signal different from the two signals provided by the transmitter, provides a weak signal; and a sloping ocean bottom results in sufficient decorrelation of the received and reference signals that detection of the reflected signal becomes difficult. Therefore, it should be unerstood that this invention may be used with sonar systems which either intentionally or otherwise having a transmitter beam which strikes the ocean bottom at a grazing angle of incidence; which therefore results in a received signal which is not a true replica of the transmitted signal; and hence the correlation techniques for detection of received signal do not function in an optimal fashion.

Referring to FIG. 1, it is seen that a wavefront of acoustic energy within the beam 15 will strike the sloping sea bottom 11 at region 2 at a later time T/2 then the same wavefront strikes the sea bottom 11 at region 1. Regions 1 and 2 represent the edges of the sea bottom 11 exposed to the beam 15. The time delay T/2 is determined by the depth $R_m$ and slope B of the sea bottom 11 as well as the beam width of the beam transmitted by transducer 12. Signals impinging on intermediate regions of the sea bottom between regions 1 and 2 experience a lesser time delay dependent upon the location of the region within the beam. Thus, the reflected received signal is the summation of incrementally delayed signals received from discrete regions of the sea bottom within the beam 15.

Figure 5:
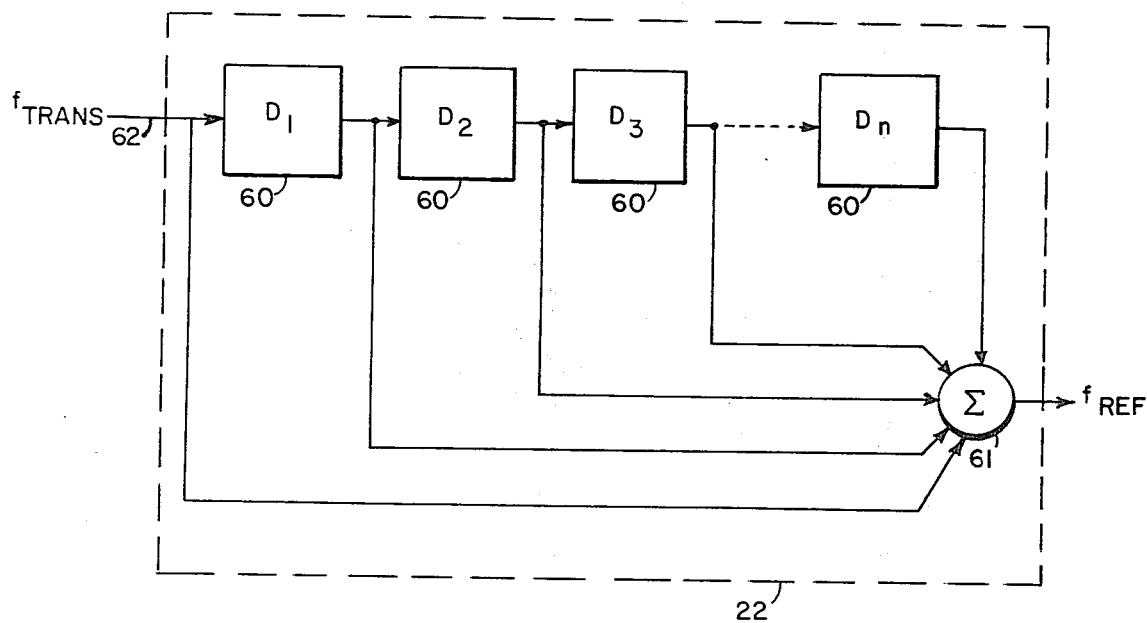
FIG. 5 is a block diagram of a transversal filter using conventional delay lines and a summing circuit.

In order to detect such a time delayed received signal by cross-correlation techniques, the other signal to the cross-correlator should match the received signal. Since the received signal is derived from the transmitted signal, matching of the received signal may be accomplished by appropriately modifying a sample of the transmitted signal to approximate the received signal. An appropriate circuit for approximating the received signal is shown in FIG. 5. A plurality of cascaded delay lines 60, $D_1$, $D_2$, ... $D_n$, have their outputs summed in summing circuit 61. A sample of the transmitted signal $f_{trans}$ applied to the input 62 produces delayed replicas at each delay line 60 output. The total delay D is the sum of the delays of the lines 60. Since the received signal $f_{rec}$ of the system of FIG. 1 is the result of a two-way delay, the total delay D should be equal to T where T/2 is the delay of the transmitted pulse as explained above. The individual delays $D_1$, $D_2$, ... $D_n$ are equal to each other and represent a stepped approximation to a sea bottom having a uniform slope. The smaller the value of each delay $D_1$, $D_2$, ... $D_n$, the smaller the steps of the approximation and the more closely the signal $f_{ref}$ of FIG. 1 approximates the received signal $f_{rec}$ to thereby improve the correlation detection. If the delays $D_1$, $D_2$, ... $D_n$ are provided by fixed delay lines, it is seen that the received signal resulting from only one value of the depth-slope product may be approximated. However, if each section 60 of the delay is variable or one stage of a charge-coupled delay line as shown in FIG. 1, the delay provided by the stage is determined by the period of the shift frequency $f_s$ applied to the charge-coupled delay line. Therefore, the total delay D of the charge-coupled delay line 23 may be changed by changing the shift frequency $f_s$ to match the total delay T of the phase front of the received signal.

FIG. 1 shows a transmitter 13 providing a pulse signal through the transmit-receive switch 14 to activate the transducer 12. In FIG. 1 the transducer 12 shown with its beam directed downward, provides a transmitted beam 15 whose beam width between half power points is designated by the symbol and the depth of the water 16 is designated by $R_m$. The ocean bottom 11 is shown as having a slope angle B, where B is measured from a horizontal direction line 17. The signal reflected from the sloping ocean bottom 11 is detected by the transducer 12 and provided through the TR switch 14 to receiver 18. The transmit $f_{trans}$ and received $f_{rec}$ signals are considered to be available at a convenient frequency for subsequent processing. If not, a signal from the transmitter 13 and receiver 18 is provided to mixers (not shown) where they are mixed with an appropriate frequency from a local oscillator to provide a replica of the transmitted signal and a replica of the received signal at the mixer's outputs respectively, at a frequency convenient for subsequent processing. Typically, in sonar applications, the transmitted and received frequencies are a few tens of kilocycles which has been found to be a convenient frequency at which to provide the signal processing required in this invention and mixing to provide a lower frequency is therefore not required. The signals $f_{rec}$ and $f_{trans}$ are pulsed signals which should ideally be identical for optimum detection of the received signal and which may be obtained by various transmitting and receiving schemes other than the two specifically mentioned in the beginning of this section. More specifically, a system may operate with FM transmission or CW transmission, however FM transmission is preferred.

In order to improve the correlation between the received signal and the transmitted signal it has been found that where the received signal is a result of receiving the transmitted signal after reflection from a relatively sloping ocean bottom, the transmitted signal $f_{trans}$ may be caused to closely approximate the received signal if the signal $f_{trans}$ is passed through a transversal filter 22 whose characteristics are appropriately chosen.

Before proceeding to consider the desired characteristics of the transversal filter, the received signal from the reflective surface is determined to experience an increment in delay T which can be calculated to a first approximation by the equation:

$$T = [2R_m \sin(\phi/2) \tan 2B]/V_s \qquad (1)$$

where $R_m$ is the median depth, $\phi$ is the beam width to the 3 db points of the transmitter beam, B is the bottom slope expressed in degrss from the horizontal 17, and $V_s$ is the velocity of sound in feet per second. Therefore, a transversal filter 22 capable of transforming the signal $f_{trans}$ to a signal $f_{ref}$ matched to the $f_{rec}$ signal for different median depths $R_m$ and different bottom slopes beta requires that its delay characteristics be controllable. It is assumed that the beam width and the velocity of sound remain constant although in the system as described this is not a requirement.

The transversal filter 22, as implemented in the preferred embodiment of this invention, is comprised of a charge coupled delay line 23 having at least N stages 231, with N outputs, and wherein the rate $f_s$ at which the $f_{trans}$ signal is sampled and shifted through the register to provide the required time delay T to match the time delay of the received signal is provided by a controllable clock frequency $f_s$ from source 24. The output of each stage of the delay line is added with unity weighting in a summing circuit 26 to provide the signal output $f_{ref}$ of transversal filter 22. A suitable charge-coupled transversal filter is described in the article "Charge-Coupled Devices for Analog Signal Processing", pp. 801–804, Proceedings of the IEEE, Vol. 64, No. 5, May 1976. A shift register could be used on the delay line with the consequent loss of amplitude information, if desired, instead of the charge coupled delay line.

The number N of cells or stages of the delay line 23 must be at least large enough to provide the required delay T and also to satisfy the Nyquist sampling rate criteria in order to provide a resultant signal $f_{rec}$ which is a reasonable replica of the received signal $f_{rec}$ for the largest expected slope-depth product. The time delay T is also given by the expression $(N-1)/f_s$. The sampling frequency $f_s$ may be given the following equation:

$$f_s = [V_s(N-1)]/2R_m \sin(\phi/2) \tan 2B \quad (2)$$

If it is assumed that $V_s = 5000$ ft. per second, beam width $\phi = 3$ degrees, depth $R_m = 1000$ ft., and the slope $B = 10$ degrees, then from equation (1) the maximum delay increment T (increase in the length of the received pulse relative to the transmitted pulse) is calculated to be 3.81 milliseconds. For a frequency $f_{trans}$ of 3.5 kilohertz and a sampling frequency $f_s$ equal to 4 $f_{trans}$ or 14 kilohertz the number of cells N required for these illustrative figures would be approximately fifty four. It is seen that "matched filtering" of the reference signal $f_{ref}$ to the received signal $f_{rec}$ for a fixed number N of stages in the transversal filter 22 may be accomplished by simply adjusting the clock rate $f_s$ of the transversal filter in accordance with the depth $R_m$ and the angle B of the ocean bottom.

The minimum range-slope product that can be accommodated is limited by the maximum clock rate at which the shift register can operate and thus provide minimum delay in the filter 22. In the example given above where there are fifty four cells and assuming that the maximum shift rate of the shift register 23 is 5 megahertz, the minimum time delay T min would be 10.6 microseconds which at a depth of 1000 ft. is equivalent to 1.6 minutes of slope of the ocean bottom.

The maximum time delay in transversal filter 22 determines the maximum depth-slope product which can be compensated. For a fixed number of cells or stages in the delay line, the maximum delay is determined by the minimum shift rate which in turn is determined by the frequency of the signal $f_{trans}$ which at a minimum must be sampled at least twice per cycle.

Figure 3:
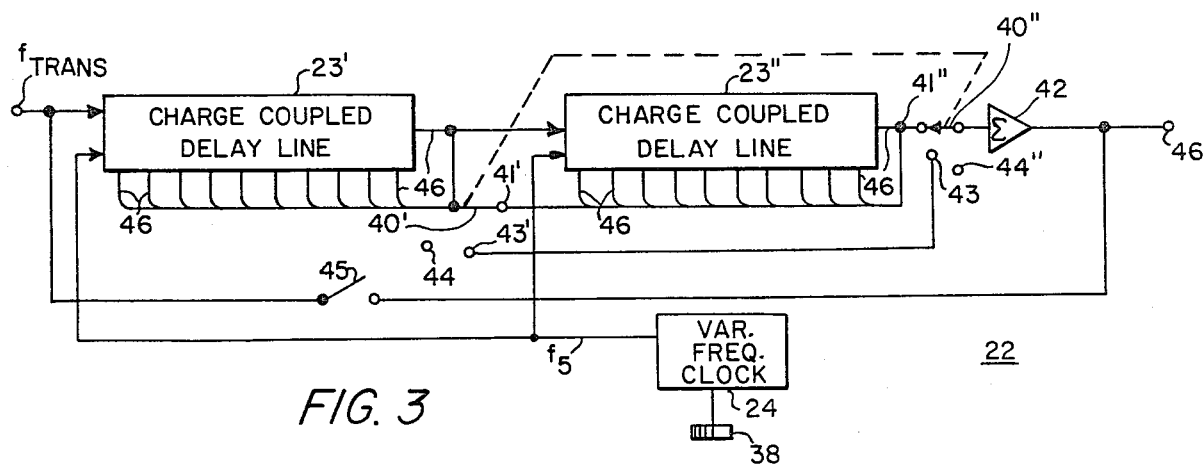
FIG. 3 is an alternate embodiment of the transversal filter used in an embodiment of the invention.

If a large ratio between $T_{max}$ and $T_{min}$ is required, the system can be simply extended by cascading delay lines as shown in FIG. 3, to be discussed in more detail subsequently.

The signals $f_{rec}$ and $f_{ref}$ are applied to cross correlator 9 which includes respective conventional bandpass filters 27, 28, limiters 29, 30, and Deltic circuits 31, 32 in that order. The Deltic circuits are conventional and well known to those skilled in the art, being shift registers or charge coupled delay devices which are shifted at the frequency $f_c$ provided by frequency source 33. The frequency $f_c$ is at least the product of the Nyquist frequency and the number of stages in the Deltic. As customary, in one-bit correlators, one of the Deltic circuits 31, 32 will contain at least one additional stage of delay so that the received and reference signals being circulated within each Deltic will shift in time with respect to one another at the Deltic outputs. The binary outputs of the Deltics 31, 32 are applied as inputs to the coincidence detector 34 where time coincidence of input ones or zeros within the coincidence detector produces an output pulse at such coincidence when the matched received $f_{rec}$ and reference $f_{rec}$ signals coincide in time because of the Deltics regardless of the initial time difference between the reference signal and the received signal. The output of the coincidence detector is applied to the "up" input of the up-down counter 35 and the frequency $f_c$ is applied to the "down" input. The output of counter 35 is provided to a comparator circuit 36 having a threshold control 37 which when exceeded provides an output 39 from comparator 36. It will be recognized by those skilled in the art that the correlator circuitry 9 is only one form of correlator known to those skilled in the art and other types of correlators or matched filters may be utilized if preferred.

Figure 2:
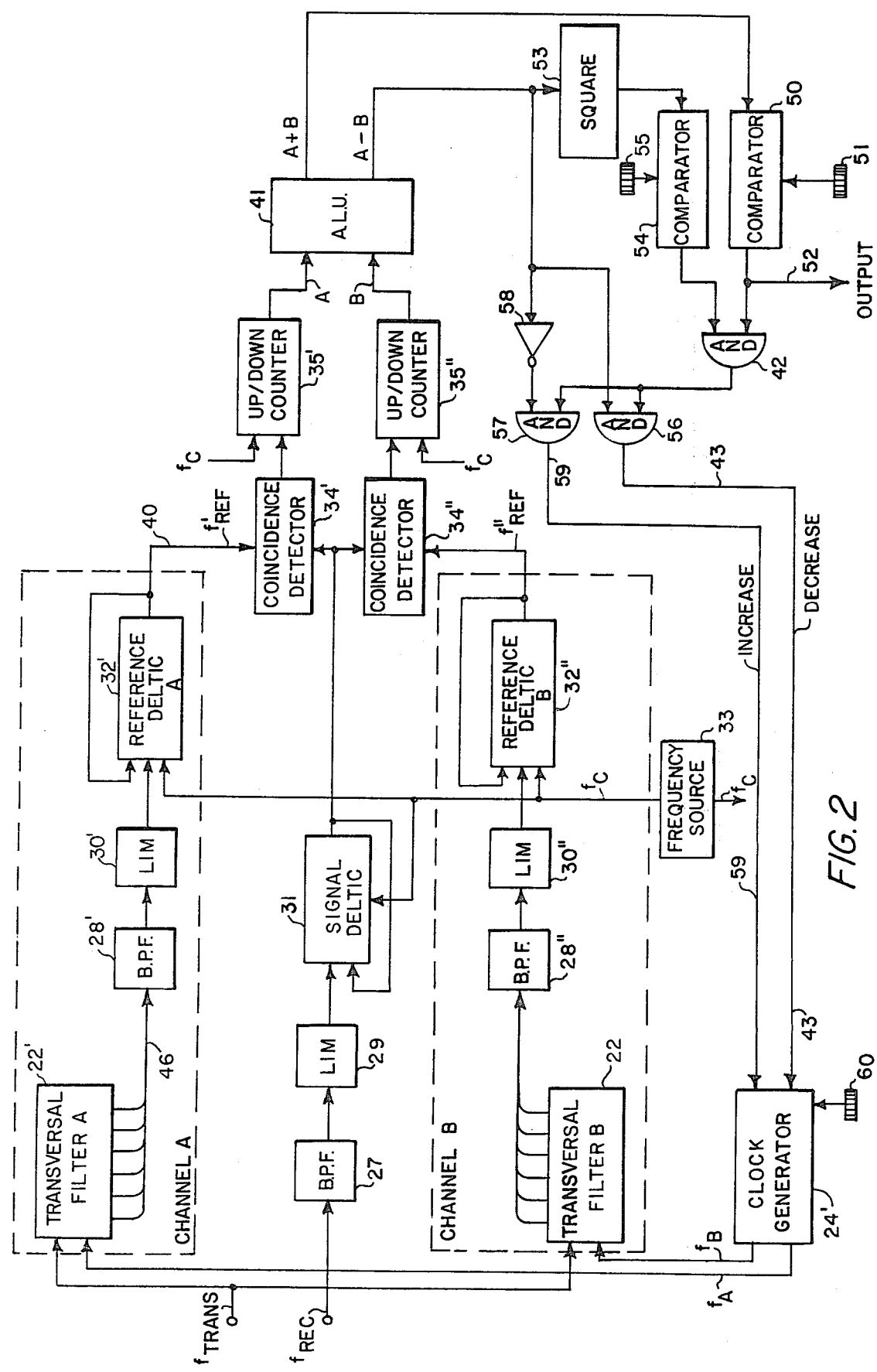
FIG. 2 is a schematic drawing of a dual channel automatic tracking embodiment of the invention.

Although matching of the received signal and the reference signal may be obtained using a manual control 38 to control the shift frequency $f_s$ of clock 24 to the transversal filter 22 in order to provide maximum output 39, it is desirable that the control of the shift frequency $f_s$ be automatic. Such an automatic control system is shown in FIG. 2 as another preferred embodiment of this invention. FIG. 2 shows only the circuitry subsequent to that of FIG. 1 which produces the received frequency $f_{rec}$ and the transmitted frequency $f_{trans}$. The signal $f_{trans}$ is sent through two transversal filters 22' and 22'' which are clocked at the frequencies $f_a$ and $f_b = f_a + f$, respectively. The output of each transversal filter 22', 22'' is bandpass filtered 22', 28'', limited 30', 30'', and processed in Deltic circuits 32', 32'', respectively. The output signal $f_{ref}$ of Deltic 32' in channel A is applied as one output to a coincidence detector 34'. The other input of detector 34' is the received signal $f_{rec}$ after processing in filter 27, limiter 29, and Deltic 31. The output of the coincidence detector 34' is applied to an up-down counter 35' whose other input is the Deltic shift frequency $f_c$. Similarly, the output $f_{ref}$ of Deltic 32'' of channel B is applied to a coincidence detector 34'' whose other input is the processed received signal $f_{rec}$. The output of the coincidence detector 34'' is applied to an up-down counter 35'' whose other input is the frequency $f_c$. The operation thus far is as explained for FIG. 1.

The outputs A and B of the counters 35' and 35'', respectively, are applied to arithmetic logic unit 41 which provides the arithmetic sum A+B and the arithmetic difference, A−B. The sum signal A+B from the arithmetic logic unit 41 is provided to a comparator circuit 50 which is also provided with a threshold signal from control 51. When the amplitude of signal A+B exceeds the threshold, comparator 50 provides an output signal 52 which indicates an echo return for the sea bottom. The presence of an output signal 52 is also provided as a logical "one" input signal to AND circuit 42. The signal A−B from the arithmetic logic unit 41 is applied to a squaring circuit 53 which provides the absolute value of the signal as an input to a comparator circuit 54 whose threshold signal is provided by control 55. When the magnitude of the absolute value of the signal A−B is greater than the value established by the threshold control 55 the comparator circuit 54 produces a logical "one" output which is provided as a second input to the AND circuit 42. Under these input conditions, the AND circuit 42 produces a logical "one" output which enables AND circuits 56 and 57. The signal A−B is also provided as an input to the AND circuits 56, 57. When the signal A−B is a positive quantity a logical 1 is provided to the enabled AND circuit 56 to provide an output signal from AND circuit 56 to provide a signal on line 43 which causes clock generator 24 to decrease equally its output frequencies $f_A$ and $f_B$. The signal A−B is provided to AND circuit 57 through inverter 58 to thereby cause the output of enabled AND circuit 57 to be high when the signal A−B is a negative. The presence of an output signal on line 59 causes the clock generator 25' to decrease its output frequencies $f_A$ and $f_B$. A low level signal will be provided at the output of gate 42, thereby preventing hunting of the output frequencies from the clock generator 24', for amplitudes of the signal A−B which are below the signal level established by the threshold control 55.

It will be further apparent that the automatic frequency control of the clock generator 24' requires that the signals A+B and A−B must simultaneously be greater than their respective threshold values in order to cause automatic frequency control to exist in clock generator 24'. When the signals on both lines 43 and 59 are in the low state, the clock generator 24' is placed in a state which allows the output frequencies $f_A$, $f_B$ of generator 24' to be scanned manually by control 60. In operation, if the signal A is greater than signal B by the amount established by the threshold control 55, and if the signal A+B exceeds the threshold established by control 51, the output 43 of AND circuit 56 will be high and cause the clock frequencies $f_A$, $f_B$ produced by generator 24' to decrease until the signal A−B falls below the threshold value established by control 55. On the other hand, if the signal A is less than the signal B, and if the signal A+B exceeds the threshold, the output 59 of gate 57 will be actuated to thereby cause the clock frequencies produced by generator 24' to increase until the signal A−B falls below the threshold value established by control 55. Thus, change in the output frequencies of clock generator 24' produced by a signal on line 43 or on line 49 is in such a direction as to cause the signals A and B to be of nearly equal magnitude and thereby provide automatic tracking and compensation for the distortion of the received signal because of the slope-depth product effect on the signal reflected from the sea bottom.

The clock generator 24' may be a conventional pulse generator wherein one of the frequencies i.e. $f_A$ is a variable frequency produced by a controllable clock generator and the frequency $f_B$ may be produced by mixing the frequency $f_A$ with a constant frequency f from an oscillator to provide the frequency $f_B$. The signals 43 and 59 may gate on a linearly increasing or decreasing voltage, respectively, to control the frequency of a voltage controlled oscillator producing the frequency $f_A$. Other circuits for providing controllable frequencies in response to control signals will be apparent to those skilled in the art.

As discussed previously the transversal filter 22 of FIGS. 1 and 2 may be comprised of charge coupled delay lines or of cascaded shift registers. The number of stages of delay needed to produce the maximum delay required is a function of the shift frequency $f_s$ which in turn is determined by the minimum number of samples per cycle (at least the Nyquist rate) of the signal being processed by the transversal filer. FIG. 3 shows charge coupled delay lines 23 serially connected by switches 40 and switched to provide different delays. The output terminals 46 of each delay section of the delay lines 23 are selectively connected to the summing circuit 42 at switch position 41 to provide the maximum delay for the condition where the maximum slope-depth product of the ocean bottom is being compensated. As the slope-depth of the ocean bottom decreases, proper compensation requires that the shift frequency $f_s$ of clock 24 is increased up to the maximum value for which the delay line will function properly. At this value of maximum allowable frequency, switch 40 is changed from position 41 to position 43 at which position only the first delay line 23' outputs would be connected to the summing circuit 42 and the shift frequency $f_s$ would be halved to provide the appropriate delay. If the slope-depth product of the ocean bottom continued to decrease, the frequency $f_s$ would again be increased to the upper frequency limit. Switch 40 would then be moved to make contact with the unconnected terminals 44 and thereby disconnect the shift registers 23' and 23'' from the circuit. Instead, switch 45 is closed to connect the input signal $f_{trans}$ directly to the output terminal 46. Closing of switch 45 would occur when the slope-depth product of the ocean bottom is sufficiently small that the received signal $f_{rec}$ is sufficiently similar to that of the transmitted signal $f_{trans}$ so that modification of the transmitted signal as in this invention is not necessary to produce good correlation between the received and transmitted signals.

Figure 4:
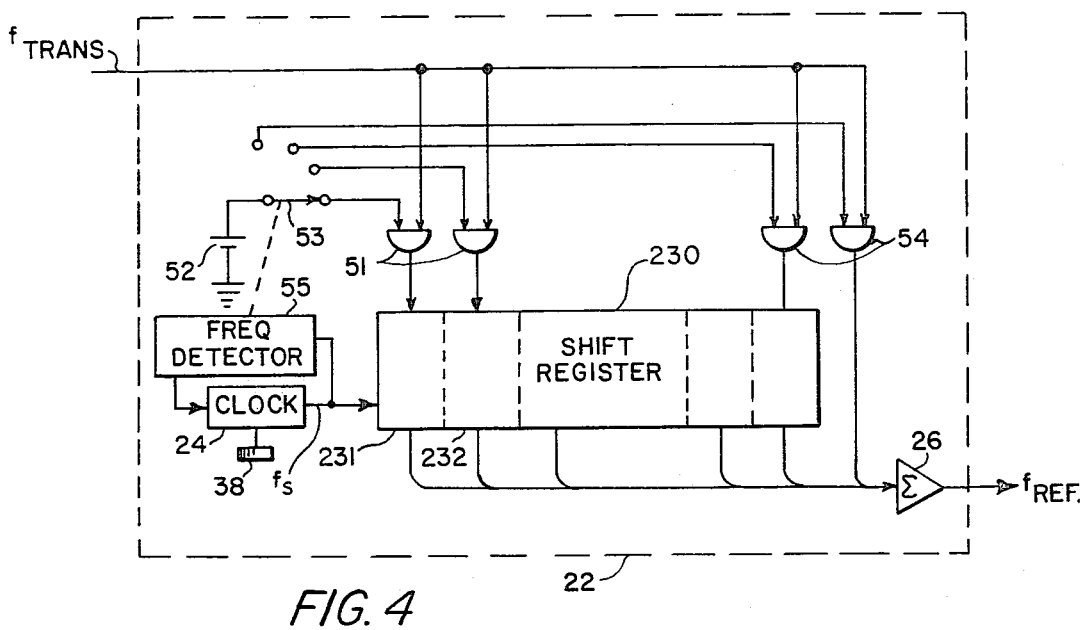
FIG. 4 is a still further embodiment of a transversal filter useful in another embodiment of the invention.

An alternate embodiment for the transversal filter 22 of FIGS. 1–3 which is particularly useful for the condition where the sea bottom becomes flat or nearly flat is shown in FIG. 4. As was stated previously, as the sea bottom becomes flatter the delay produced by the delay line or shift register 23 of filter 22 is reduced by increasing the shift frequency applied to the shift register. Ideally, a flat sea bottom requires no incremental delay in the reference signal which in turn requires that the shift frequency be infinite for the embodiments of FIGS. 1–3. In practice however, some incremental delay is tolerable and a finite maximum shift frequency is acceptable because perfect match of the received signal with the replica is not necessary.

The alternative embodiment of the filter 22 of FIGS. 1–3 is shown in FIG. 4. Shift register 230 decreases the delay experienced by the signal $f_{trans}$ by causing the signal $f_{trans}$ to be inserted into the input of later stage of the shift register 230 according to the lesser delay that is desired. For example, if maximum delay is desired, the signal $f_{trans}$ is inserted into the input stage 231 of shift register 230 by gating "on" gate 51 by applying to it an enabling signal from source 52 through selector switch 53. If maximum delay is desired, the shift frequency $f_s$ will also be the lowest allowed frequency compatible with the required Nyquist sampling rate of the input signal $f_{trans}$. These operating conditions will correspond to the largest depth-slope product of the sea bottom for which compensation is desired. As the slope decreases the frequency $f_s$ is manually increased by control 38 to the maximum value which the shaft register is capable of accommodating in order to provide the minimum delay. Alternatively, the frequency $f_s$ may be maintained constant if the step delay obtained by switching switch 53 to the next stage 232 of the shift register is sufficiently small so that the desired degree of match between the signals $f_{rec}$ and $f_{ref}$ is obtained. Also alternatively, the switch contacts may be connected to spaced apart stages of the shift register thereby reducing the required number of switch contacts, if the shift frequency $f_s$ is also varied between its minimum and maximum values to smooth the transition between the time delays obtained from adjacent switch positions.

It will be recognized that the shaft frequency of FIG. 4 may be automatically controlled by using the circuitry of FIG. 2 wherein the transversal filter of FIG. 4 is substituted for those shown in FIG. 2. Automatic switching of switch 53 is accomplished simply by switching to its next switch position producing less delay when the shift frequency $f_s$ reaches its highest allowed value. A frequency detecting circuit 55 connected to the switch 53 causes the switch to move to the next switch position which decreases the delay. At the instant switch 53 is switched, the frequency detecting circuit 55 connected to the clock source 24 causes it to abruptly change to a lower shift frequency such that the total delay produced by shift register 23 is substantially unchanged. This process of reducing the delay by reducing the number of stages of delay and increasing the frequency continues as the sea bottom continues to become flatter. When the sea bottom is flat, the signal $f_{trans}$ is gated directly through gate 54 to the input of summer circuit 26 without having gone through any delay in the stages of the shift register 230. The frequency detecting circuit 55 is also responsive to the lowest allowable frequency to cause switch 53 to move to the next switch position to increase the delay and to abruptly change the shift frequency of clock 24 to a predetermined higher frequency to avoid a discontinuity in the total time delay when switching occurs.

As seen in FIG. 4, each stage 231, 232, of register 230 has an output connected as one of the inputs of summing circuit 26, but only those stages at or which follow the stage at which the signal $f_{trans}$ is gated into the register 230 contribute to the signals applied as inputs to summing circuit 26.

Having described a preferred embodiment of the invention it will not be apparent to one of skill in the art that other embodiments incorporating its concept may be used. It is believed therefore that this invention should not be restricted to the disclosed embodiment but rather should be limited only by the spirit and scope of the appended claims.

What is claimed is:

1. A sonar transmitting and receiving system for comprising:

transmitter means for transmitting a sonic signal and for directing such transmitted sonic signal towards a reflecting surface;

receiver means for receiving the transmitted sonic signal which is reflected from said reflecting surface;

a transversal filter connected to said transmitter;

means connected to said transversal filter for producing first clock pulses having a controllable frequency;

said filter including means for sampling said transmitted sonic signal and for shifting said sample signal through said filter at a rate related to the frequency of said first clock pulses to provide a replica at the transversal filter output of the received signal;

a correlator circuit means connected to the output of said transversal filter and an output of said receiver means for providing an output signal having a magnitude related to the correlation between said replica of the received signal and the actually received signal.

2. The system of claim 1 comprising in addition:

means connected to said source of clock pulses for changing the frequency of said clock pulses.

3. The system of claim 2 wherein said correlator circuit comprises:

a first channel connected to the output of said receiver;

a second channel connected to the output of said transversal filter;

each channel comprising a bandpass filter, a limiter, and a deltic serially connected in the order named to said outputs, each deltic connected to a second clock pulse source to shift said deltic at a rate at least twice the product of the Nyquist frequency of the transmitted frequency and the number of steps in the deltic, the number of stages in the deltics being different by at least one stage;

the output of the deltic of each channel being provided as inputs of a coincidence detector;

means for counting the coincidences per unit time at the output of said coincidence detector in response to the frequency of said first clock pulses;

whereby a count in excess of a predetermined value indicates the detection of a received signal from the sea bottom.

4. A sonar transmitting and receiving system for automatically compensating for the effect of the slope of the sea bottom comprising:

means for providing a transmit signal;

means for providing a received signal in response to the transmit signal reflected from said sea bottom;

means for providing first and second clock signals having frequencies which differ from one another by a prescribed fixed amount, the frequency of such signals being in accordance with a control signal;

a first and second transversal filter connected respectively to said first and second clock signal means;

the inputs of said first and second transversal filters also being connected to said transmit signal means;

means for correlating output signals of said first and second transversal filters respectively with said received signal to provide first and second output signals respectively;

means for nulling the difference between the first and second output signals comprising means for producing the control signal in accordance with the difference between said first and second output signals.

5. A system for detecting a received signal reflected from an object which distorts the transmitted signal comprising:

means for transmitting a signal;

means for receiving said signal after said signal is reflected from said object;

delay means having at least one input terminal and a plurality of output terminals, each of said output terminals providing a signal having a different delay with respect to a signal at said input terminal;

said transmitted signal also being provided to said input terminal to provide a delayed replica of said transmitted signal at each output terminal of said delay means;

means connected to said delay means for changing the delay of said delayed replica signal at each output terminal;

means for summing the signals at each delay line output terminal to provide a replica of received signal;

means for detecting said received signal by correlating said replica signal with said received signal.

6. A method for detecting a received signal obtained by reflection of a transmitted signal comprising:

processing the transmitted signal by passing said transmitted signal through a variable time delay line means having a plurality of different time delay outputs to provide a plurality of replicas of said transmitted signals delayed in time with respect to one another in accordance with the different time delays, summing said plurality of transmitted signal replicas to provide a replica of said received signal;

comparing said replica of said received signal with said received signal to provide an output signal corresponding to the correlation between said replica and said received signal;

varying the delay of said transmitted signal in passing through said variable delay line in accordance with the output signal.

7. The method of claim 6 wherein said varying of the delay comprises changing the shift frequency of the variable delay line where said variable delay is a shift register having a plurality of outputs between stages of said shift register.

8. A method for detecting a received signal reflected from an object which distorts the transmitted signal comprising the steps of:
transmitting a signal;
receiving said signal after said signal is reflected from said object;
providing a plurality of delayed replicas of said transmitted signal, each of said plurality having a different delay with respect to each other;
summing the delayed replica signals to provide a sum signal;
detecting said received signal by correlating said sum signal with said received signal.

9. The method of claim 8 comprising in addition:
changing the delay of said delayed replica signal at each output terminal with respect to each other.

10. A sonar transmitting and receiving system comprising:
a transmitter of a sonic signal;
a receiver of said sonic signal to provide the transmitted signal as reflected from said sea bottom;
a transversal filter connected to said transmitter;
a source of first clock pulses of controllable frequency connected to said transversal filter;
said filter sampling said transmitted signal and shifting said sampled signal through said filter at a rate determined by said first clock pulses to provide a modified replica of said transmitted signal at the filter output;
a correlator circuit connected to the output of said filter and the output of said receiver to provide an output signal whose magnitude is determined by the correspondence between said modified replica of said transmitted signal and said received signal.

11. The system of claim 10 comprising in addition:
means connected to said source of clock pulses for changing the frequency of said clock pulses.

12. The system of claim 11 wherein said correlator circuit comprises:
a first channel connected to the output of said receiver;
a second channel connected to the output of said transversal filter;
each channel comprising a bandpass filter, a limiter, and a deltic serially connected in the order named to said outputs, each deltic connected to a second clock pulse source to shift said deltic at a rate at least twice the product of the Nyquist frequency of the transmitted frequency and the number of steps in the deltic, the number of stages in the deltics being different by at least one stage;
the output of the deltic of each channel being provided as inputs of a coincidence detector;
means for counting the coincidences per unit time at the output of said coincidence detector in response to the frequency of said first clock pulses;
whereby a count in excess of a predetermined value indicates the detection of a received signal from the sea bottom.

13. A sonar transmitting and receiving system for automatically compensating for the slope of the sea bottom comprising:
means for providing a transmit signal;
means for providing a received signal in response to the transmit signal reflected from said sea bottom;
means for providing first and second clock frequencies which differ in frequency by a prescribed fixed amount;
a first and second transversal filter connected respectively to said first and second clock frequency means;
the inputs of said first and second transversal filters also being connected to said transmit signal means;
means for correlating the output signals of said first and second transversal filters respectively with said received signal to provide first and second output signals respectively;
means for comparing the amplitude of said first and second output signals to provide a control signal which is provided as an input to said first and second clock frequency means;
said control signal causing the frequency means to provide first and second clock frequencies to assume values which cause the first and second output signals to be equal in amplitude.

14. A system for detecting a received signal reflected from an object which distorts the transmitted signal comprising:
means for transmitting a signal;
means for receiving said signal after said signal is reflected from said object;
delay means having at least one input terminal and a plurality of output terminals, each of said output terminals providing a signal having a different delay with respect to a signal at said input terminal;
said transmitted signal also being provided to said input terminal to provide a delayed replica of said transmitted signal at each output terminal of said delay means;
means connected to said delay means for changing the delay of said delayed replica signal at each output terminal;
means for summing the signals at each delay means output terminal to provide a replica of the received signal;
means for detecting said received signal by correlating said sum signal with said received signal.

15. A method for detecting a received signal obtained by reflection of a transmitted signal comprising:
processing the transmitted signal by passing said transmitted signal through a delay line having a plurality of incremental delay sections and summing the output of each delay section to provide a replica of said received signal;
comparing said replica of said received signal with said received signal to provide an output signal corresponding to the correlation between said replica signal and said received signal;
changing the delay experienced by said transmitted signal in passing through said delay line sections to change said replica signal and thereby provide an output signal in response to said changed replica signal.

16. The method of claim 15 wherein said changing the delay comprises changing the shift frequency of the delay line.

* * * * *